Jan. 15, 1924.
S. P. JOHNSON ET AL
1,480,615
CONTROL SYSTEM FOR MACHINE TOOLS
Filed Feb. 2, 1921
3 Sheets-Sheet 1
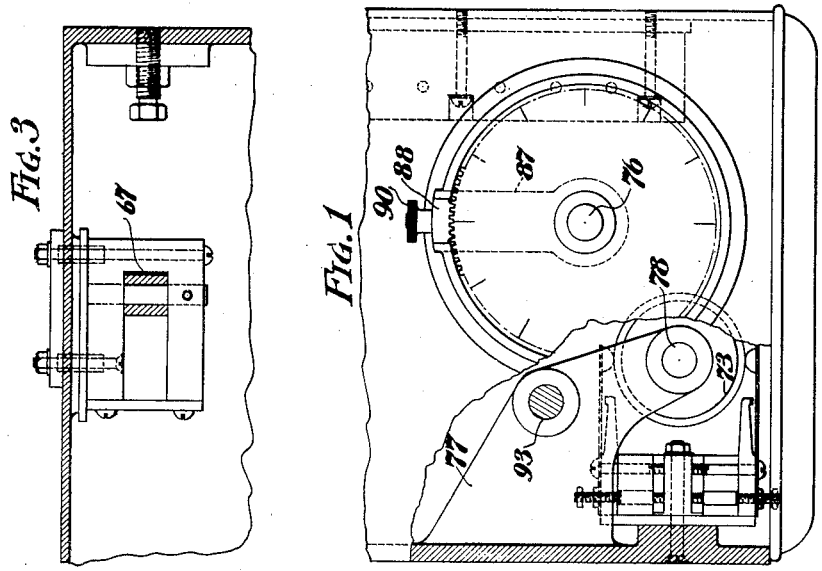
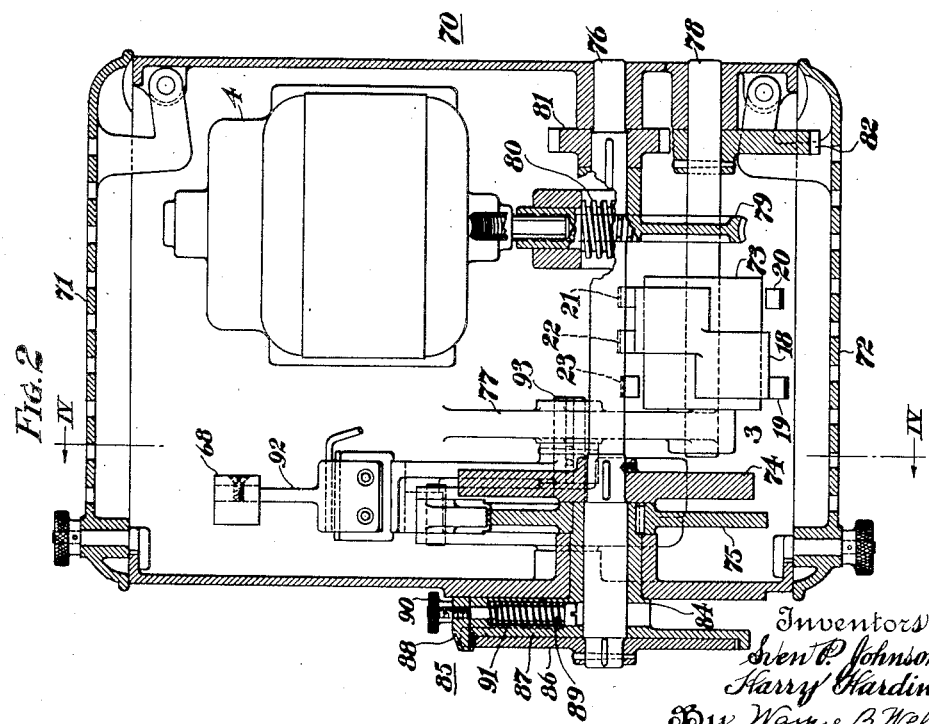
Inventors
Sven P. Johnson &
Harry Harding.
By Wayne B. Wells
Attorney Jan. 15, 1924.  
S. P. JOHNSON ET AL  
1,480,615  
CONTROL SYSTEM FOR MACHINE TOOLS  
Filed Feb. 2, 1921  
3 Sheets-Sheet 2
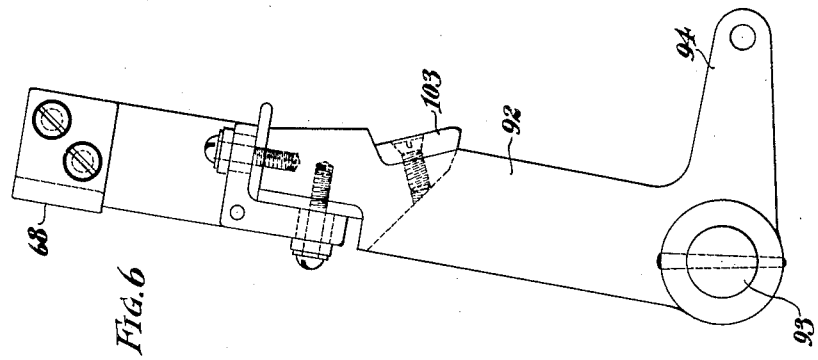
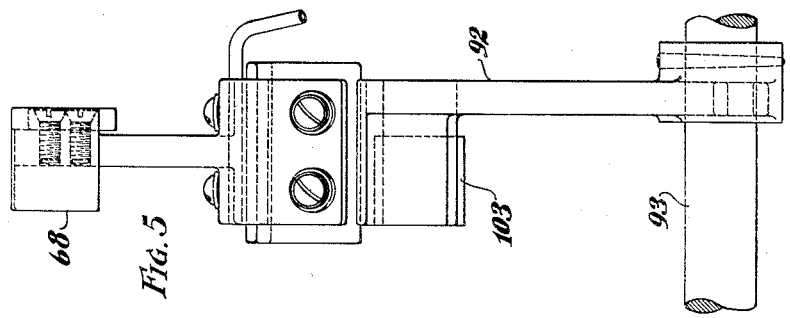
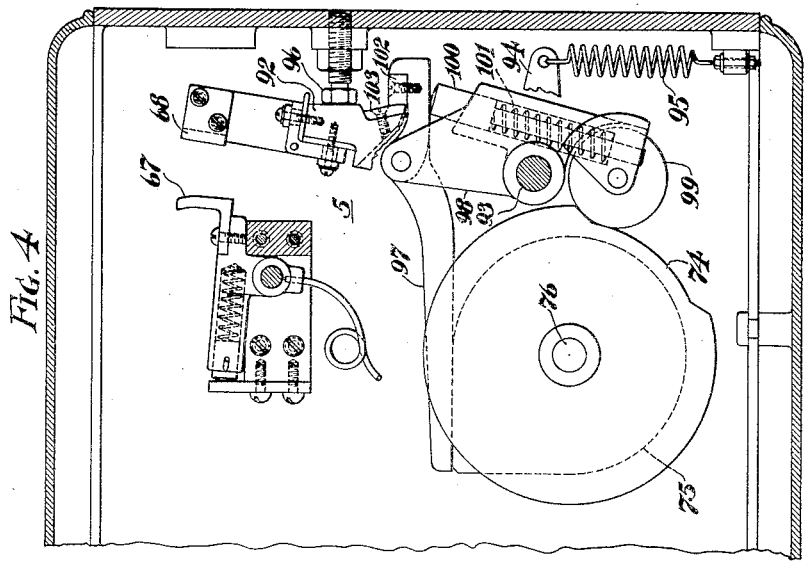
Inventors  
Sven P. Johnson &  
Harry Harding  
By Wayne B Wells  
Attorney Patented Jan. 15, 1924.

1,480,615

UNITED STATES PATENT OFFICE.

SVEN P. JOHNSON, OF PHILADELPHIA, PENNSYLVANIA, AND HARRY HARDING, OF COLLINGDALE, DELAWARE, ASSIGNORS TO NILES-BEMENT-POND COMPANY, OF NEW YORK, N. Y., A CORPORATION OF NEW JERSEY.

CONTROL SYSTEM FOR MACHINE TOOLS.

Application filed February 2, 1921. Serial No. 441,827.

*To all whom it may concern:*

Be it known that we, SVEN P. JOHNSON and HARRY HARDING, citizens of the United States, residing at Philadelphia, in the county of Philadelphia, and at Collingdale, in the county of Delaware, and State of Pennsylvania, respectively, have invented certain new and useful Improvements in Control Systems for Machine Tools, of which the following is a specification.

Our invention relates to control systems and particularly to control systems for governing the operation of machine tools.

One object of our invention is to provide a control system for a planer, a slotter or a similar machine tool that shall be provided with a feed motor which is so governed by the reciprocating member of the machine tool as to effect a feeding operation in either direction, as desired, and that shall be provided with means for effecting a traverse operation in either direction, as desired, independent of the position of any of the parts for effecting a feeding operation.

Another object of our invention is to provide a control system of the above indicated character that shall comprise a control motor governed by the reciprocating member of the machine tool, means comprising a control switch for operating a feed motor to effect a feeding operation in either direction as desired, and cam members directly operated by the control motor for so operating the control switch as to limit the operation of the feed motor.

It is to be understood that when we refer to a planer we intend to include any like mechanism and particularly a machine tool having a work carrying table and a cutting tool cooperating with the table. Furthermore, it is to be understood either the cutting tool or the carrying table is reciprocated relative to the other member and the cutting tool is fed relative to the work in any well known manner.

Our invention is an improvement on the system disclosed in the patent to S. P. Johnson, 1,342,915, dated June 8, 1920.

In the accompanying drawings:

Figure 1 is a partial plan view of the feed control box utilized in our system.

Fig. 2 is a sectional elevational view of the feed control box shown in Fig. 1.

Fig. 3 is a detailed view of a portion of the control switch.

Fig. 4 is a partial sectional view of the feed control box along the line IV—IV of Fig. 2.

Figs. 5 and 6 are enlarged detail views of the main lever for the control switch.

Figure 7:
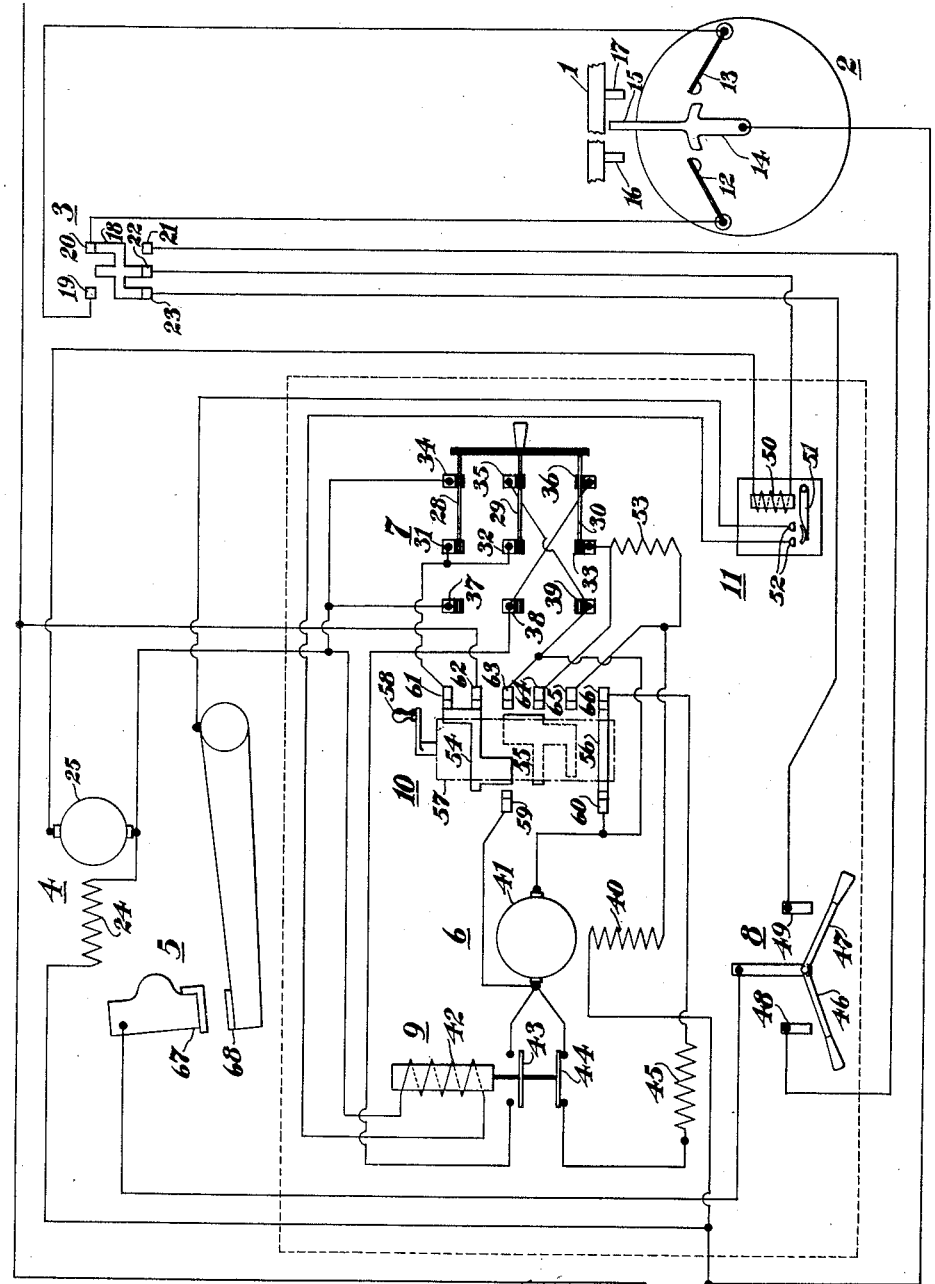
Fig. 7 is a diagrammatical view of a control system constructed in accordance with our invention.

Referring to the accompanying drawings and particularly to Fig. 7, a planer (not shown) is provided with a work carrying table 1 which operates a pilot switch 2. The pilot switch 2 controls the feeding of the cutting tool (not shown), across the work being operated upon. Inasmuch as the operation of the main driving motor in accordance with the movement of the planer table is well known, it has been deemed unnecessary to illustrate the main driving motor and its electrical connections. Moreover, it has been considered unnecessary to illustrate the cutting tool and the means for feeding it across the work being operated upon, inasmuch as such parts are clearly disclosed in the prior art.

The pilot switch 2 is connected to a limit switch 3 and controls the operations of a control motor 4. The control motor 4 directly operates a control switch 5 which in turn governs the operation of a feed motor 6. A feed reverse switch 7 is provided for controlling the direction of the feeding operation and a switch 8 is provided for determining which end of the planer stroke the feeding operation is to be effected. In this regard, it may be noted that a feeding operation may be effected at either or both ends of the planer stroke.

A contactor 9, which is controlled by the switch 5, is provided not only for completing a circuit for the feed motor 6 but also for completing a dynamic-braking circuit for such motor upon the releasing of the control switch 5. A traverse controller 10 is provided for effecting a traverse operation of the cutting tool at any time independent of the position any of the parts for effecting a feeding operation may occupy. A relay 11, which is controlled by the pilot switch 2, is provided for completing the energizing circuit of the contactor 9 through the control switch 5.

The pilot switch 2, which is diagrammatically illustrated in Fig. 7 of the drawings, essentially consists of two stationary contact members 12 and 13 and a movable contact member 14. The movable contact member 14 is provided with an extension 15 which is engaged by lugs 16 and 17 that are mounted on or in any way connected to the planer table 1. The lugs 16 and 17 serve to initiate a feeding operation in accordance with the movement of the planer table. The lug 17 serves to initiate a feeding operation at the end of the forward movement of the planer table. The lug 16 serves to initiate a feeding operation at the end of the reverse movement of the planer table. The feeding operation at either end of the stroke is controlled as hereinafter set forth.

The limit switch 3 comprises a movable contact segment 18 and five stationary contact members 19 to 23 inclusive. The contact segment 18 is mounted upon a drum which is controlled by the motor 4.

The control motor 4 comprises a field-magnet winding 24 and an armature 25. The field-magnet winding 24 is connected across a supply circuit comprising conductors 26 and 27. The armature 25 is connected across the conductors 26 and 27 through the feed reverse switch 7 and the limit switch 3 by means of the pilot switch 2.

The feed reverse switch 7 comprises three movable blades 28, 29 and 30 which are respectively connected to stationary contact members 31, 32 and 33. The contact blades 28, 29 and 30 are adapted to engage stationary contact members 34, 35 and 36 when the switch is in position for effecting a feeding operation in a forward direction and are adapted to engage stationary contact members 37, 38 and 39 when the switch is in position for effecting a feeding operation in a reverse direction.

The feed motor 6 comprises a field-magnet winding 40 and an armature 41. The contactor 9 comprises an energizing coil 42 and two switch members 43 and 44. The switch member 43 serves to complete an energizing circuit for the feed motor upon operation of the contactor and the switch member 44 serves to complete a dynamic-braking circuit upon release of the contactor. A resistor 45 is provided in the dynamic braking circuit for the feed motor.

The switch 8 comprises two independently movable switch blades 46 and 47 and two stationary contact members 48 and 49. The switch 8 serves to effect a feeding operation at either or both ends of the planer stroke. When the switch blade 47 engages the contact member 49, a feeding operation is effected at the end of a forward movement of the planer table and, when the switch blade 46 is in engagement with the stationary contact member 48, a feeding operation is effected at the end of the reverse movement.

The relay 11 comprises an energizing coil 50, which is connected across the supply conductors 26 and 27 by means of the pilot switch 2, and a switch arm 51 which is operated by the coil 50 to bridge stationary contact members 52. The relay 11 serves to complete a circuit through the switch 5 and the energizing coil of the contactor 9. A resistor 53 is provided for limiting the speed of the feed motor under certain conditions as will hereinafter be set forth.

The traverse controller 10 comprises three contact segments 54, 55 and 56 which are mounted upon any suitable drum 57. The drum is preferably operated by a suitable handle 58. Stationary contact members 59 to 66 inclusive are provided for engagement with the contact segments 54, 55 and 56 according to the operative position of the controller. The controller is shown in the off position and, in such position, the contact segment 56 engages the contact members 60 and 66 for completing a dynamic-braking circuit through the motor 6 upon release of the contactor 9. The contact segment 54 bridges the stationary contact members 61 and 62 for connecting various parts of the system to the supply conductor 27 to effect feeding operations.

The control switch 5 comprises a stationary contact member 67 and a movable contact member 68. The construction of the switch will be described more in detail when reference is made to Figs. 1 to 6 inclusive of the drawings. The limit switch 3 and the control switch 5 are directly operated by the control motor 4.

Referring to Figs. 1 to 6 inclusive, a suitable feed control box 70 is provided for containing the control motor 4, the limit switch 3 and the control switch 5. The box 70 is provided with end covers 71 and 72 which are suitably hinged on the walls of the box in order to permit their being swung outwardly to have access to the contained apparatus. The covers 71 and 72 are perforated as shown in Fig. 2 of the drawings in order to permit the ventilating of the various electrical apparatus contained in the box.

The motor 4 is mounted on a side wall of the box 70 and serves not only to rotate the drum 73 of the limit switch 3 but also serves to operate two cam members 74 and 75 for effecting operation of the control switch 5. A shaft 76, which supports the two cam members 74 and 75, is provided with bearings in the walls of the box 70. A shaft 78, which has bearings in one wall of the box and in a bracket 77, serves to support the drum 73 of the limit switch 3. A worm wheel 79 is preferably keyed to the shaft 76 and meshes with a worm 80 that is fixedly mounted on the shaft of the motor 4. A pinion 81, which is fixedly mounted on the shaft 76, meshes with a gear wheel 82 that is keyed to the shaft 78. Thus, the motor 4 not only serves to rotate the shaft 76, which supports the cam members 74 and 75, but also serves to rotate the shaft 78 which supports the drum 73 of the limit switch 3.

The cam member 74 is fixedly connected to the shaft 76 whereas the cam member 75 is fixedly connected to a sleeve member 84 which is rotatably mounted on the shaft 76.

An adjustable device 85 is provided not only for adjusting the position of the cam member 75 relative to the position of the cam member 74 but also for connecting the cam member 75 to the shaft 76. The device 85 comprises a notched disk 86 which is fixedly connected to the shaft 76 in any suitable manner in order to be rotated therewith. An arm 87, which is connected to the sleeve member 84, carries a toothed block 88 that is adapted to engage the teeth formed in the disk 86. The block 88 is attached to a plunger 89 by means of a nut 90. The plunger 89 extends within the arm 87 and is biased by means of a spring member 91 to force the block 88 into engagement with the disk 86. By changing the position of the block 88 on the periphery of the disk 86 the position of the cam member 75 relative to the cam member 74 may be varied.

The movable contact member 68 of the switch 5 is mounted upon a lever 92, as shown in Fig. 4 of the drawings. The lever 92 is mounted upon a shaft 93 adjacent to the two cam members 74 and 75. The lever 92 is provided with an arm 94 which is engaged by a spring member 95 for biasing the switch 5 to open position. The opposite end of the spring member 95 is attached to the feed control box 70. Normally, when the switch 5 is in a released position, the lever 92 is held in engagement with a stop member 96 which is attached to the side of the box 70.

A lever 97 which engages the cam member 75 is pivotally mounted on a U-shaped member 98. The U-shaped member 98 is rotatably mounted on the shaft 93 and carries not only a roller 99, which engages the cam member 74, but also a plunger 100 which is biased into engagement with one end of the lever 97 by means of a spring member 101. One end of the lever 97 is provided with a latched portion 102 which engages a projecting portion 103 on the lever 92.

Upon rotation of the shaft 76 by the control motor 4, the cam member 74 operates through the roller 99, the plunger 100, and the levers 97 and 92 to force the contact member 68 into engagement with the contact member 67. The lever 92 is operated against the tension of the spring member 95. However, when the cam member 75 is rotated to a predetermined position one end of the lever 97 is raised to release the projection 103 on the lever 92 from the latch 102 which is formed on the lever 97. Thereupon, the spring member 95 immediately opens the switch 5 and returns the lever 92 to normal position in engagement with the stop member 96.

The stationary contact members 19 to 23 inclusive, of the limit switch 3 are mounted in any suitable manner upon one wall of the feed control box, as shown in Fig. 1 of the drawings.

Although no feeding means or cutting tool is shown directly connected to the feed motor 6, it is to be understood that any suitable feeding mechanism may be operated by such motor, such for example, as the mechanism which is described in the patent to Johnson No. 1,342,915.

Assuming the various parts of the apparatus to be in the position shown in Fig. 7 of the drawings and the switch blades 46 and 47 of the switch 8 to engage the stationary contact members 48 and 49, the operation of the control system is as follows:

Upon completion of the forward movement of the planer table 1, the lug 17 engages the projection 15 of the contact member 14. The contact member 14 is moved into engagement with the stationary contact member 12 for completing a circuit from the supply conductors 26 and 27 to effect a feeding operation.

One circuit, which is completed through the pilot switch 2, extends from the supply circuit 26 through the contact members 14 and 12 of the pilot switch, contact members 20 and 22, which are bridged by contact segment member 18 of the limit switch 3, the energizing coil 50 of the relay 11, armature 25 of the control motor 4, contact members 31 and 34, which are bridged by the switch blade 28, and the contact members 61 and 62, which are bridged by contact segment 54, to the supply conductor 27. The completion of the above circuits effects operation not only of the relay 11 but also of the control motor 4. Upon operation of the control motor 4, the cam member 74 operates to close the switch 5 and to effect engagement between the contact members 67 and 68. Upon engagement between the contact members 67 and 68, a circuit is completed which extends from the supply conductor 26 through the contact members 12 and 14 of the pilot switch 2, contact members 20 and 23, which are bridged by contact segment 18 of the limit switch 3, contact terminal 49 and the switch blade 47 of the switch 8, switch 5, contact members 51 and 52 of the relay 11, energizing coil 42 of the contactor 9, contact members 34 and 31, which are bridged by switch blade 28, and the contact members 61 and 62, which are bridged by the contact segment 54, to the supply conductor 27.

Thereupon, the contactor 9 is operated for completing a circuit through the feed motor 6. The circuit through the feed motor 6 extends from the supply conductor 26 through the field-magnet winding 40, resistor 53, contact members 33 and 36, which are bridged by the switch blade 30, contact member 38, switch member 43, armature 41, contact member 39, contact members 35 and 32, which are bridged by switch blade 29, and contact members 61 and 62, which are bridged by contact segment 54 to the other conductor 27 of the supply circuit. Thereupon the motor 6 is operated to effect a feeding operation of the tool (not shown) across the work being operated upon.

At a predetermined time, the cam member 75 operates the lever 97 to open the switch 5. Thereupon, the circuit of the energizing coil 42 of the contactor 9 is opened to release such contactor. The circuit through the feed motor 6 is broken and a dynamic-braking circuit is completed which extends from one terminal of the armature 41 through the switch member 44, resistor 45, and the contact members 60 and 66, which are bridged by the contact segment 56 to the other terminal of the armature 41. The braking circuit effects an efficient and quick stopping of the motor 6 to limit the feeding operation.

The contact segment 18 of the limit switch 3 is operated by the control motor 4 to disengage contact members 20 and 23 and to effect engagement between the contact members 19 and 21. The limit switch prepares the system for effecting a feeding operation at the end of the reverse movement of the planer table. When the planer table 1 reaches the end of its movement in a reversed direction, the lug 16 engages the projection 15 to move the contact member 14 into engagement with the stationary contact member 13. Thereupon, a circuit is completed which extends from the supply contact 26 through the contact members 14 and 13 of the pilot switch 2, contact members 19 and 22, which are bridged by contact segment 18, energizing coil 50 of the relay 11, armature 25, contact members 34 and 31, which are bridged by switch blade 28 and contact members 61 and 62, which are bridged by contact segment 54, to the other conductor 27 of the supply circuit. The relay 11 is operated to bridge the contact members 52. The control motor 4 is operated to close the switch 5 by the cam member 74 in the manner heretofore set forth.

Upon closing of the switch 5, a circuit is completed from the supply conductor 26 through the contact members 13 and 14, contact members 19 and 21, which are bridged by contact segment 18, contact terminal 48 and switch blade 46 of the switch 8, contact members 67 and 68 of the switch 5, contact members 51 and 52, energizing coil 42 of the contactor 9, contact members 34 and 31, which are bridged by switch blade 28, and contact members 61 and 62, which are bridged by the contact segment 54, to the other conductor 27 of the supply circuit. The contactor 9 operates to energize the feed motor 6 in the manner above described. A feeding operation is effected which is limited by the opening of the switch 5 by means of the cam member 75.

In case it is desired to effect a feeding operation only at the end of the forward movement of the planer table, the switch blade 46 of the switch 8 is disengaged from the contact member 48. If it is desired to feed only at the end of the reversed movement of the planer table, the switch blade 47 is separated from the contact member 49 and the switch blade 46 is maintained in engagement with the contact member 48. If it is desired to operate the motor 6 for feeding in the opposite direction, the switch blades 28, 29 and 30 of the switch 7 are separated from the contact terminals 34, 35 and 36 and are moved into engagement with the contact members 37, 38 and 39. Such change in position of the switch 7 serves to reverse the direction of rotation of the feed motor. The resistor 53 is connected in circuit with the motor 6 during all feeding operations in order to limit the speed of such motor.

In the above operation it should be noted that the cam member 74 serves to close the switch 5 and the cam member 75 serves to open the switch 5 for limiting the operation of the feed motor 6 and accordingly to limit the depth of feed. Moreover the adjustment of the cam members 74 and 75 relative to each other by means of the mechanism 85 serves to determine the depth of the feed that is effected.

In case it is desired to effect a traverse operation at any time, independent of the position of the apparatus for effecting a feeding operation, the traverse controller 10 is given a movement of rotation in a clockwise or in a counter-clockwise direction according to the operation desired. If the controller is given a movement of rotation in a clockwise direction, a traverse operation in a reverse direction is effected and if the controller is given a movement of rotation in a counter-clockwise direction, a traverse operation in a forward direction is effected.

If the controller is given a movement of rotation in a clockwise direction to effect a traverse operation in a reverse direction the contact terminal 61 is disconnected from the contact segment 54 to open the circuits which are adapted to effect a feeding operation. The dynamic braking circuit which extends through the contact members 66 and 60 is opened by reason of the disengagement between the contact member 66 and the contact segment 56. The contact segment 54 engages the contact terminal 59 and the contact segment 55 engages the contact terminals 63 and 64. The portion of the contact segment 54, which is disposed adjacent to the contact terminal 62, extends entirely around the controller drum in order to constantly connect such segment to the supply conductor 27.

In such position of the traverse controller 10, a circuit is completed through the feed motor 6, which extends from the supply conductor 26 through the field-magnet winding 40, resistor 53, contact terminals 64 and 63, which are bridged by the contact segment 55, armature 41, and contact terminals 59 and 62, which are bridged by the contact segment 54, to the supply conductor 27. In the next position of the controller, the contact segment 55 engages the contact terminal 65 for excluding the resistor 53 from circuit to increase the speed of operation of the feed motor. Thus, the traverse operation is effected to rapidly move the cutting tool (not shown) in a reverse direction.

When it is desired to effect a traverse operation in a forward direction, the controller 10 is given a rotation in a counter-clockwise direction to effect engagement between the contact segment 54 and the contact terminal 63 and also to effect engagement between the contact segment 55 and the contact terminals 64 and 59. The contact terminal 61 is disengaged from the contact segment 54 and the contact terminal 60 is disengaged from the contact segment 56 for the purposes heretofore set forth.

In such position of the controller 10, a circuit is completed from the supply conductor 26 which extends through the field-magnet winding 40, resistor 53, contact terminals 64 and 59, which are bridged by the contact segment 55, armature 41, and contact terminals 63 and 62, which are bridged by the contact segment 54, to the supply conductor 27. The feed motor 6 is so rotated as to effect a traverse operation in a forward direction. Upon further movement of the controller, the resistor 53 is excluded from circuit by engagement of the contact terminal 65 with the contact segment 55 to increase the speed of such operation. In the above operation, the resistor 53 is included in the circuit of the feed motor 6 during all feeding operations and during traverse operation in a forward or in a reverse direction such resistor 53 is excluded from circuit. Thus, either traverse operation is effected at an increased speed.

In the system above described, a feeding operation of the cutting tool across the work may be effected at either end of the stroke or at each end of the stroke and each of such feeding operations may be limited by adjusting the cam member 75 relative to the cam member 74. The traverse operation of the feeding tool in a forward or in a reverse direction is effected by means of the controller 10 independent of any position the parts for effecting the feeding operation may occupy.

Modifications in the system and in the arrangement and location of parts may be made within the spirit and scope of our invention and such modifications are intended to be covered by the appended claims.

What we claim is:

1. In a control system, the combination comprising a feed and a control motor, means comprising a cam member operated by the control motor for closing a circuit of the feed motor, and means comprising a second cam member adjustable with respect to the cam member for closing the feed motor circuit and operated by the control motor for opening the circuit of the feed motor after a predetermined time.

2. In a control system for a machine tool, the combination with a feed motor, a pilot switch intermittently operated by the machine tool, and a control motor operated by the pilot switch, of a control switch for limiting the operation of the feed motor, and cam members operated by said control motor for respectively opening and closing said control switch.

3. In a control system for a machine tool having a reciprocating member, the combination comprising a feed and a control motor, a pilot switch controlled by the reciprocating member for governing the control motor, a control switch for controlling the feed motor, and two cam members operated by the control motor for respectively opening and closing said control switch.

4. In a control system, the combination with a feed and a control motor, and a pilot switch for governing the operation of said control motor, of a control switch, two cam members operated by said control motor for operating said control switch to limit the operation of said feed motor, and means for adjusting said cam members with respect to each other, said switch being operated in accordance with the relative position of said cam members.

5. In a control system for a machine tool having a reciprocating member, the combination with a control motor, means controlled by the reciprocating member for operating said control motor, a feed motor, and a control switch for operating the feed motor, of a cam member fixedly connected to the control motor for closing said control switch, and a second cam member adjustably connected to the control motor for limiting the operation of said control switch.

6. In a control system for a machine tool having a reciprocating member, the combination with a feed and a control motor, a pilot switch controlled in accordance with the operation of the reciprocating member and serving to effect operation of the control motor, and a control switch for governing the operation of the feed motor, of a cam member operated by said control motor for closing said control switch, means comprising a second cam member operated by the control motor for opening said control switch and means for relatively adjusting said cam members to control the depth of feed.

7. In a control system, the combination with a feed and a control motor and a switch for operating the feed motor, of means comprising a cam member fixedly connected to, and a second cam member adjustably connected to, the control motor for operating said switch to effect a predetermined feed.

8. In a control system for a machine tool, the combination with a control motor and means comprising a switch for controlling the feed of the machine, of a cam member fixedly connected to, and a second cam member adjustably connected to said motor for operating said switch, the relative position of said cam members serving to determine the operating period of said switch.

9. In a control system for a machine tool, the combination with a pilot switch, a control motor operated by said pilot switch, a feed motor, and a control switch for governing the feed motor, of means operated by the control motor for operating the control switch predetermined periods, and means for selectively completing a circuit through the control switch to operate the feed motor and to effect a feeding operation in various operative positions of the machine.

10. In a control system for a machine tool having a reciprocating member, the combination with a feed motor and a control motor, of two cam members operated by the control motor and a switch controlled by the cam members for operating the feed motor a predetermined length of time at either end or both ends of the stroke of the reciprocating member.

11. In a control system for a machine tool having a reciprocating member, the combination with a feed motor for effecting a feeding operation, and a control motor, of means for closing the circuit of the control motor at each end of the stroke of the reciprocating member, and means comprising two cam members and a switch opened and closed by the two cam members for operating the feeding motor a predetermined period for any operation of the control motor.

12. In a control system for a machine tool having a reciprocating member, the combination with a feed motor, and a control motor operated at each end of the stroke of the reciprocating member, of a cam-operated switch opened and closed by the control motor for operating the feed motor to effect a set feeding operation in accordance with the operation of the reciprocating member.

13. In a control system for a machine tool, the combination comprising a feed motor, a control motor, means comprising cam members operated by the control motor for governing the feed motor to limit the depth of feed, and means for so operating the feed motor as to effect a feeding operation at either or both ends of the stroke.

14. In a control system for a machine tool having a reciprocating member, the combination with a pilot switch operated at the ends of the stroke, a control motor operated by said pilot switch, a feed motor, and a control switch for controlling the feed motor, of means comprising cam members operated by the control motor for closing said control switch predetermined lengths of time, and means for so completing a circuit through said control switch as to operate the feed motor at either end or both ends of the stroke of the reciprocating member.

15. In a control system for a machine tool having a reciprocating member, the combination with a feed motor and means comprising a control motor for operating said feed motor in accordance with the position of the reciprocating member, of means for traversing in either direction independent of the position of any of the parts for effecting a feeding operation.

16. In a control system for a machine tool having a reciprocating member, the combination with a feed motor, and means comprising a control motor and cam members operated thereby for operating the feed motor in accordance with the movement of the reciprocating member, of means comprising a controller for effecting a traversing operation in either direction independent of the position of any of the parts for effecting a feeding operation.

17. In a control system for a machine tool having a reciprocating member, the combination comprising a feed motor, a switch for operating the feed motor, and means comprising a control motor and cam members operated thereby for operating said switch in accordance with the movement of the reciprocating member to effect a feeding operation in either direction, of means comprising a switch member for effecting a traverse operation in either direction independent of the position of any of the parts for effecting a feeding operation.

In testimony whereof, we hereto affix our signatures.

SVEN P. JOHNSON.
HARRY HARDING.